(12) United States Patent
Young et al.

(10) Patent No.: US 10,981,556 B2
(45) Date of Patent: Apr. 20, 2021

(54) SYSTEM AND METHOD FOR ENGINE CONTROL

(71) Applicant: Transportation IP Holdings, LLC, Norwalk, CT (US)

(72) Inventors: Henry Todd Young, Erie, PA (US); Jason Daniel Kuttenkuler, Wattsburg, PA (US); Jeffrey John Wolff, Erie, PA (US); Aaron Craig Mellinger, San Diego, CA (US)

(73) Assignee: TRANSPORTATION IP HOLDINGS, LLC, Norwalk, CT (US)

(*) Notice: Subject to any disclaimer, the term of this patent is extended or adjusted under 35 U.S.C. 154(b) by 0 days.

(21) Appl. No.: 16/696,963

(22) Filed: Nov. 26, 2019

(65) Prior Publication Data

US 2020/0094811 A1 Mar. 26, 2020

Related U.S. Application Data

(60) Continuation of application No. 16/107,848, filed on Aug. 21, 2018, now Pat. No. 10,525,964, which is a
(Continued)

(51) Int. Cl.
| | |
|---|---|
| *B60W 20/10* | (2016.01) |
| *F02D 31/00* | (2006.01) |
| *B60W 10/06* | (2006.01) |
| *B60W 10/08* | (2006.01) |
| *B60W 30/188* | (2012.01) |

(Continued)

(52) U.S. Cl.
CPC ............ *B60W 20/10* (2013.01); *B60W 10/06* (2013.01); *B60W 10/08* (2013.01); *B60W 30/1882* (2013.01); *F02D 31/007* (2013.01); *B60K 6/46* (2013.01); *B60Y 2200/41* (2013.01); *F02D 41/10* (2013.01); *Y02T 10/62* (2013.01)

(58) Field of Classification Search
CPC ...... B60W 20/10; B60W 10/06; B60W 10/08; B60W 30/1882; F02D 31/007; F02D 41/10; B60K 6/46; B60Y 2200/41; Y02T 10/62
See application file for complete search history.

(56) References Cited

U.S. PATENT DOCUMENTS

| | | |
|---|---|---|
| 3,551,685 A | 12/1970 | Corry |
| 8,774,994 B2 | 7/2014 | Young et al. |

(Continued)

OTHER PUBLICATIONS

Brazilian Patent and Trademark Office, Search Report Issued in Application No. BR102015026645-6, Jun. 1, 2020, Rio de Janeiro, 4 pages.

*Primary Examiner* — Hieu T Vo
(74) *Attorney, Agent, or Firm* — McCoy Russell LLP

(57) ABSTRACT

Embodiments of the subject matter disclosed herein relate to controlling engine operating points and power for full throttle command in an off-highway vehicle, such as a diesel electric haul truck, to increase fuel efficiency. In one example, a system includes an engine and a controller. The controller is configured to determine a target engine horsepower and associated target engine speed, command the engine to operate at a first engine speed above the target engine speed, adjust a load placed on the engine to reach the target engine speed, and command the engine to operate at a second engine speed to reach the target engine horsepower.

15 Claims, 7 Drawing Sheets

Related U.S. Application Data division of application No. 14/856,747, filed on Sep. 17, 2015, now Pat. No. 10,081,349.

(60) Provisional application No. 62/067,396, filed on Oct. 22, 2014.

(51) Int. Cl.
*B60K 6/46* (2007.10)
*F02D 41/10* (2006.01)

(56) References Cited

U.S. PATENT DOCUMENTS

| | | |
|---|---|---|
| 10,081,349 B2 | 9/2018 | Young et al. |
| 10,525,964 B2 * | 1/2020 | Young ................... B60W 20/10 |
| 2009/0037047 A1 | 2/2009 | Hawkins et al. |

\* cited by examiner

SYSTEM AND METHOD FOR ENGINE CONTROL

CROSS REFERENCE TO RELATED APPLICATIONS

The present application is a continuation of U.S. Non-Provisional patent application Ser. No. 16/107,848, entitled "SYSTEM AND METHOD FOR ENGINE CONTROL", and filed on Aug. 21, 2018. U.S. Non-Provisional application Ser. No. 16/107,848 is a divisional of U.S. Non-Provisional application Ser. No. 14/856,747 entitled "SYSTEM AND METHOD FOR ENGINE CONTROL", and filed on Sep. 17, 2015. U.S. Non-Provisional patent application Ser. No. 14/856,747 claims priority to U.S. Provisional Patent Application No. 62/067,396, entitled "SYSTEM AND METHOD FOR ENGINE CONTROL", and filed on Oct. 22, 2014. The entire contents of each of the above-listed applications are hereby incorporated by reference for all purposes.

FIELD

Embodiments of the subject matter disclosed herein relate to controlling engine speed in a vehicle.

BACKGROUND

Historically, vehicle operators of haul vehicles (e.g., mines) wanted maximum performance to maximize productivity of the haul vehicles. Diesel electric drive systems were tuned to extract the maximum power out of the engine without regard to fuel efficiency. As the mining environment evolves, mines are becoming increasingly concerned with efficiency and are willing to accept minor impact on production.

BRIEF DESCRIPTION

In one example, a system includes an engine and a controller. The controller is configured to determine a target engine horsepower and associated target engine speed. The controller is further configured to command the engine to operate at a first engine speed above the target engine speed, adjust a load placed on the engine to reach the target engine speed, and command the engine to operate at a second engine speed to reach the target engine horsepower.

BRIEF DESCRIPTION OF THE DRAWINGS

The invention will be better understood from reading the following description of non-limiting embodiments, with reference to the attached drawings, wherein below.

DETAILED DESCRIPTION

Embodiments of the subject matter disclosed herein relate to optimizing engine operating points and power for full throttle command in an off-highway vehicle, such as a diesel electric haul truck. Historically, haul vehicles ran at full engine speed (e.g., 1900 rpm) and maximum power when an operator commanded 100% throttle. According to embodiments disclosed herein, to reduce fuel consumption, engine speed may be initially set to a reduced fixed speed, such as 1830 rpm, and then the drive system may load the engine to drag the engine speed down to a target speed, such as 1800 rpm. Additionally, the commanded engine speed may be adjusted to allow operation at a set output (e.g., horsepower), providing significant fuel savings with minimal power reduction. This disclosure adds flexibility by providing a method of respecting a specific horsepower (HP) rather than engine speed and then determining the engine speed necessary to support the HP. The disclosure also includes additional details on setting the desired HP level based on operating parameters such as vehicle weight, grade (measured or estimated), and truck speed. It also describes an option of a remote operator (e.g., mine dispatch system) providing a max HP based on vehicle position in the haul route. It further describes a method for the drive system to monitor operator throttle command and fine tune the max power over multiple haul cycles.

The approach described herein may be employed in a variety of engine types, and a variety of engine-driven systems selected with reference to application specific criteria. Some of these systems may be stationary, while others may be on semi-mobile or mobile platforms. Semi-mobile platforms may be relocated between operational periods, such as mounted on flatbed trailers. Mobile platforms include self-propelled vehicles. Such vehicles can include on-road transportation vehicles, as well as mining equipment, marine vessels, rail vehicles, and other off-highway vehicles (OHV). For clarity of illustration, a mine haul vehicle may be used as an example of a mobile platform supporting a system incorporating an embodiment of the invention.

Figure 1:
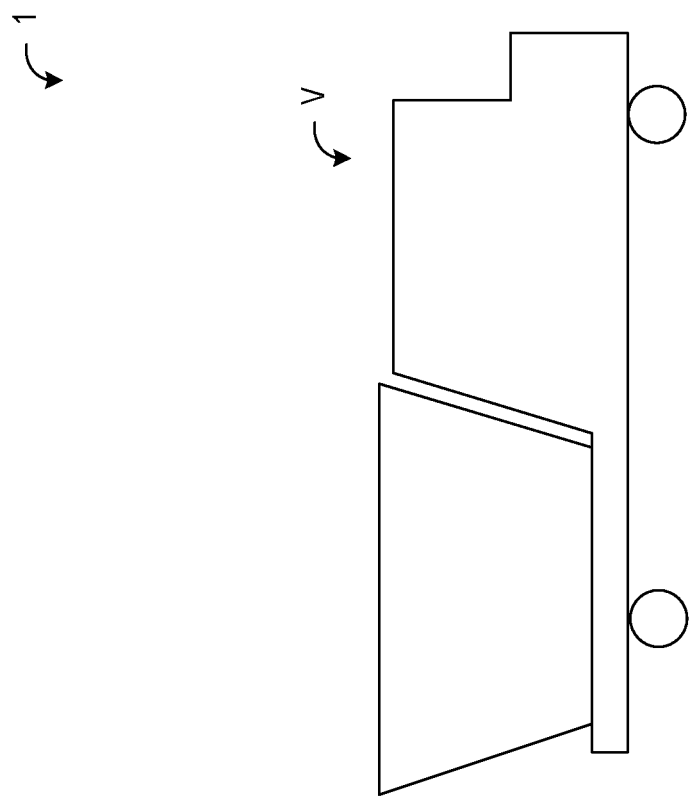
FIG. 1 shows a schematic diagram of a vehicle convoy.

Before further discussion of optimizing engine operating points and power for full throttle command, an example mine haul vehicle is shown. FIG. 1 illustrates a convoy 1 of two mine haul vehicles, each labeled "V". While two vehicles are illustrated in FIG. 1, it is to be understood that any suitable number of vehicles could be included in the convoy 1. During operation of the convoy 1, each vehicle V may be operated to maintain a threshold distance between each vehicle and/or maintain a threshold vehicle speed. During standard operation, each vehicle V may be operated at full accelerator pedal command (e.g., 100% throttle), also referred to as full propel call or full call. Each vehicle V may be controlled to a set engine speed, engine power, or other command when operated at full call. However, due to variations between vehicles, full call may result in different vehicle speeds, particularly while climbing grades or when the vehicles are operated with large payloads. As a result, bunching of the vehicles may occur (e.g., vehicles may be forced to operate in tighter-spaced groups limited by the slowest vehicle rather than being optimally or equally distributed within the convoy) and/or vehicle operators may be forced to derate vehicle power.

Figure 2:
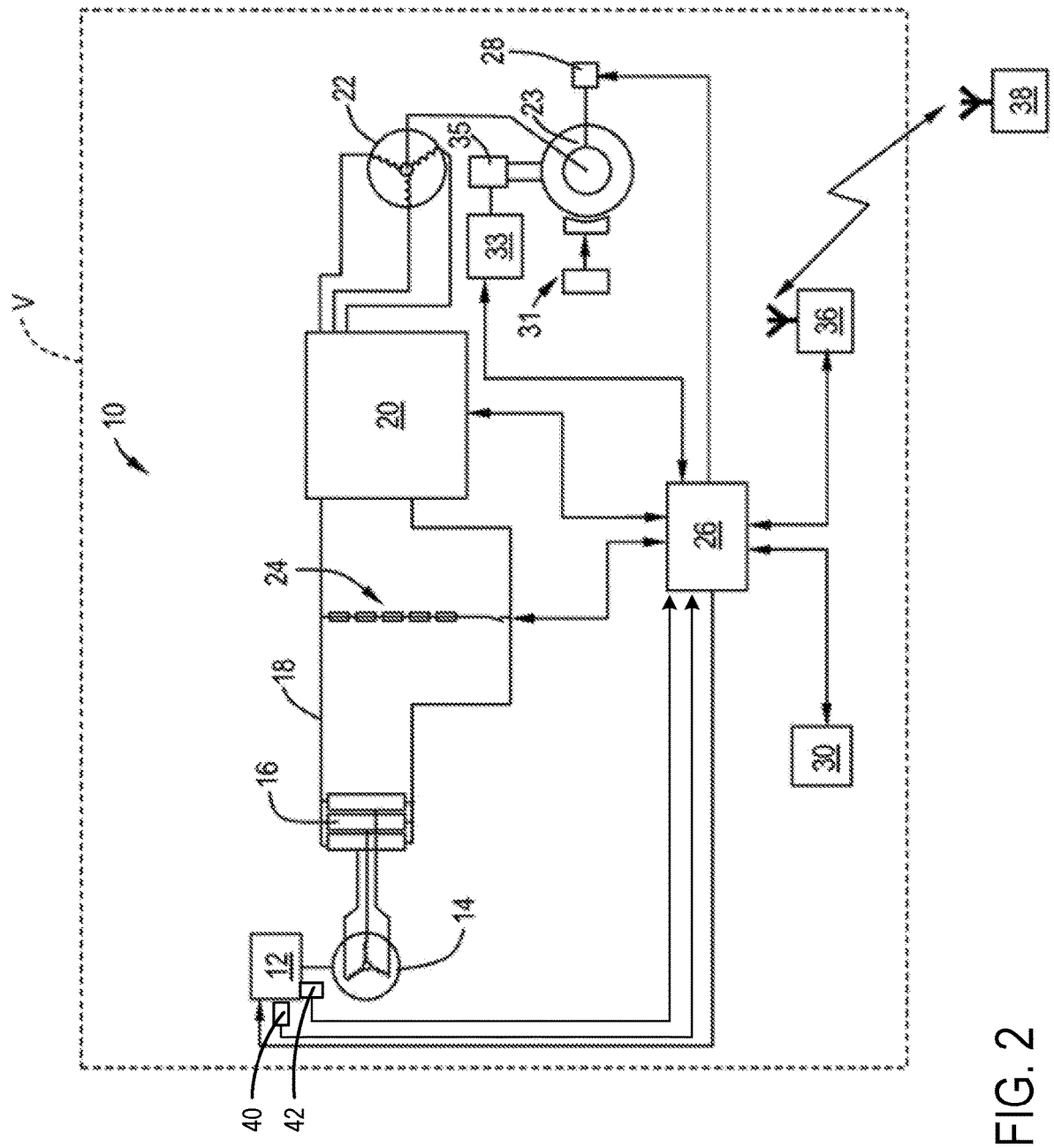
FIG. 2 shows a schematic diagram of a vehicle of the vehicle convoy of FIG. 2.

FIG. 2 shows an example vehicle from convoy 1 including a vehicle system 10. The vehicle system 10 includes a prime mover 12. In the illustrated example the prime mover 12 is a diesel engine, and the term "engine" may be used interchangeably with the term "prime mover" throughout the remainder of this description. The engine may include a plurality of cylinders configured to receive fuel from a plurality of fuel injectors. The prime mover 12 drives an alternator 14. The output of the alternator 14 is converted into DC via a rectifier bank 16. The DC power is provided over a DC bus 18 to an inverter unit 20. The inverter unit 20 includes DC-to-AC conversion circuitry of a known type, and also employs components such as Insulated Gate Bipolar Transistors (IGBTs) or thyristors operating as pulse width modulators (not shown) to provide a AC power to a traction motor 22 which is coupled to a wheel 23 through a known type of reduction gear (not separately shown). For the sake of illustrative simplicity, only one inverter unit 20 and traction motor 22 are shown, with the understanding that the vehicle V may be provided with multiple traction motors 22 driven by multiple inverter units 20.

While an AC-DC-AC system is described herein, is should be noted that the principles of the present disclosure may be applied to other drivetrain configurations, e.g. using an alternator or DC generator as a power source, and using AC or DC traction motors. Furthermore, the principles of the present disclosure are also applicable to other types of vehicles, such as rail vehicles or road vehicles. The vehicle V may use any type of element adapted to exert a tractive force. Examples of tractive elements include wheels, axles, or translating or reciprocating structures. The term "traction motor" could encompass, for example, electric or hydraulic linear motors.

One or more chains of grid resistors 24 are connected across the DC bus 18. The grid resistors 24 may be selectively coupled to the DC bus 18 to dissipate power generated by the traction motor 22 and thereby provide dynamic braking. This is referred to as a "retard" function. Other electrical energy absorbing devices may be used in place of the grid resistors 24 to dissipate and/or use the power generated, for example batteries, a regenerative system, or equipment to use the power like auxiliary systems and accessories.

The vehicle V includes at least one braking device 31 of a known type. The braking device 31 may be a service, parking, or emergency brake, and may be hydraulically, mechanically, or electrically operated. Most typically, the vehicle V would include a service brake system plus an emergency or parking brake system.

A microprocessor-based controller 26 has operative connections to the engine 12, the grid resistors 24, the inverter unit 20, and to numerous sensors within the drive train, such as a wheel speed sensor 28 coupled to the wheel 23. While illustrated in FIG. 2 as comprising a single unit, it is to be understood that controller 26 may be comprised of multiple, separate control units that may be operatively coupled to each other. Among other functions, the control units of controller 26 have the capability to control the speed of the engine 12, to command the inverter unit 20 to apply current to drive the traction motor 22 in a forward or reverse direction, to modulate the current level supplied to the traction motor 22, to control the amount of load placed on the engine 12 by the alternator 14, and to connect the traction motor 22 to the grid resistors 24 through the inverter unit 20 to effect the retarder function. The controller 26 is provided signals from various discrete sensors of the vehicle, including but not limited to signals from an engine speed sensor 40 and an engine output sensor 42. In addition to the various discrete sensors, the controller 26 is provided with feedback from the inverter unit 20 which is indicative of the magnitude of the torque being applied to the traction motor 22. The controller 26 is also provided with a mechanism for determining the weight of a payload carried by the vehicle V, such as via a suspension pressure calculation. For example, the vehicle V may include a payload meter 33 which computes total vehicle weight based on sensed air pressure in the vehicle's suspension struts 35. The payload meter 33 can communicate the total vehicle weight to the controller 26 over a communications channel such as a serial bus. The payload may be determined in another suitable manner, such as provided to the controller from an off-board sensor.

A control panel 30, also referred to as a "driver information display" is coupled to the controller 26. The control panel 30 includes a display for presenting information to the driver, and one or more controls for operating the vehicle V. In some examples the display is a multi-line LED, and the controls are configured as a plurality of fixed and configurable keys. It will be understood that the control panel could be configured differently, for example it could take the form of a touch screen interface. In addition to the control panel 30 the vehicle V also includes one or more discrete vehicle controls operatively coupled to the controller 26, such as accelerator pedal (not shown).

Optionally, the controller 26 may include means for two-way communication with a remote operator or dispatcher (see FIG. 1, shown schematically at 38). As illustrated the controller 26 is coupled to a transceiver 36 which communicates with the dispatcher 38 through a wireless link.

The controller 26 may include non-transitory instructions executable to carry out one or more methods described herein. As explained above, controller 26 may be comprised of multiple control units operatively connected to one another. For example, a first control unit may regulate fueling of the engine and a second control unit may regulate load placed on the engine by the alternator. The first control unit may regulate fueling of the engine by sending a signal to adjust an opening degree and/or duration of one or more fuel injectors of the engine (e.g., the signal may cause a solenoid in the fuel injector to be energized for a given duration to open the fuel injector). The second control unit may regulate load placed on the engine may adjusting the electrical load on the alternator, which is proportional to the load placed on the engine by the alternator. To adjust the electrical load on the alternator, the second control unit may selectively couple the alternator to the resistive grids, increase output of the traction motors, etc. Additionally, the second control unit may send an engine speed command to the first control unit.

As explained previously, to reduce fuel consumption, a vehicle having a drive system, such as the vehicle V described above with respect to FIG. 2, may be operated at a set engine horsepower when a maximum throttle request is received. The set engine horsepower may be based on operating parameters, predetermined in advance based on capabilities of the vehicle, or other suitable parameters. To achieve operation at the set horsepower, once a maximum throttle request is received and the set horsepower determined, a target engine speed is obtained, for example from a look-up table, based on the set horsepower. The target engine speed is used as input to the fuel controller (e.g., the first control unit described above), and fuel amounts supplied to the engine may be adjusted to reach the target engine speed. During the period of time where engine speed is increasing from the initial speed to the target speed, engine horsepower may be unregulated. Once the target engine speed is reached (or once an engine fueling limit is reached), the drive system controller (e.g., the second control unit described above) may adjust the load placed on the engine by the alternator until the set horsepower is reached. In this way, the engine may be operated at an operating point for maximum torque and hence highest efficiency, and the engine speed maintained at a lowest possible speed for the desired output.

Figure 3:
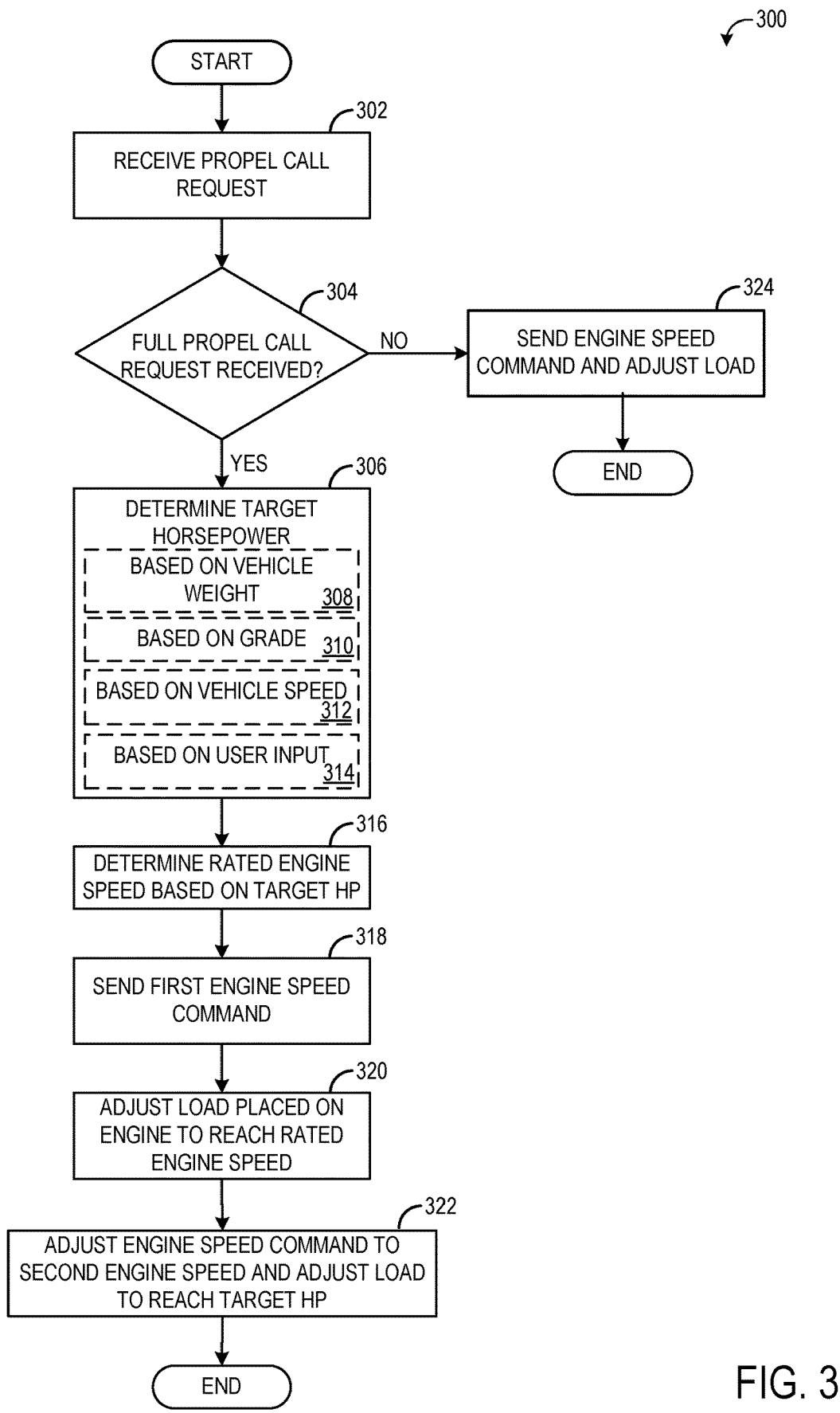
FIG. 3 is a flow chart illustrating an example method for operating the vehicle of FIG. 2.

Turning now to FIG. 3, a method 300 for operating an engine at a target horsepower is presented. Method 300 may be performed by a controller, such as the controller 26 described above, in combination with various sensors and actuators, such as an engine speed sensor, engine output sensor, fuel injectors, etc., according to instructions stored on memory of the controller. In one example, method 300 is performed by the second control unit of controller 26, described above, that controls drive system (e.g. controls the load placed on the engine by the alternator). At 302, method 300 includes receiving a propel call request. The propel call request may include an operator of the vehicle depressing an accelerator pedal, for example, or other input mechanism requesting a given vehicle speed. At 304, method 300 determines if the request includes a full propel call request. A full propel call request may include a fully depressed accelerator pedal, a 100% throttle request, or other maximum vehicle speed request. If a full call request is not received, method 300 proceeds to 324 to send an engine speed command to a separate fuel control unit (e.g., the first control unit described above) and adjust the load placed on the engine to reach a target horsepower defined by the requested propel call. The fuel control unit may adjust engine fueling to reach the commanded speed. Method 300 then ends.

If a full call request is received, method 300 proceeds to 306 to determine a target horsepower (HP). The target HP may be determined according to a suitable mechanism. In one example, the target HP may be a target predetermined during a previous operation, or may be a target predetermined by a user, such as an operator of the vehicle or a remote operator in communication with the vehicle. The target HP may be the maximum HP the engine is capable of providing. In another example, the target HP may be a default HP, such as 90% of peak configured HP. Further, the target HP may be adjusted based on operating conditions. For example, the default target HP described above may be adjusted based on vehicle weight, as indicated at 308. As vehicle weight increases, the target HP may increase to allow the vehicle to maintain a desired vehicle speed. In another example, the default target HP may be adjusted based on the grade at which the vehicle is traveling, as indicated at 310. This may include increasing the target HP as grade increases. In a further example, the default target HP may be adjusted based on vehicle speed, as indicated at 312. This may include increasing the target HP as vehicle speed increases. Additionally, in some examples, the default target HP may be adjusted based on user input, as indicated at 314. Further, the target HP may be within a range of 60-100% of maximum rated HP for the vehicle.

At 316, a rated engine speed is determined based on the target HP. In one example, the rated engine speed may be obtained from a look-up table that is indexed to the target HP, or according to another suitable mechanism. The rated engine speed may be an engine speed that corresponds to maximum torque for the engine, for example, in order to operate the engine at high efficiency. In an example, the control unit may be configured to adjust the look-up table that indexes rated engine speed to target HP based on past engine operation. For example, once operation at maximum torque is achieved, if one or more of the engine speed or HP achieved at the maximum torque deviates from the values in the table, the table may be adjusted. At 318, a first engine speed command is sent to the separate fuel control unit. The first engine speed command may be the rated engine speed determined above in one example. In another example, the first engine speed may be an engine speed that is slightly above the rated engine speed, such as between 1-5% above the rated engine speed or a set speed above the rated engine speed, such as 30 rpm above the rated engine speed. In this way, the separate fuel control unit may adjusting fueling to the engine to attempt to reach the first engine speed command.

At 320, the load placed on the engine is adjusted to reach the rated engine speed. The load may be placed on the engine by the alternator, and thus alternator load may be adjusted (e.g., electrical loads on the alternator coupled or uncoupled or other suitable mechanism) to adjust the engine load. The load placed on the engine may be adjusted concurrent to the fueling adjustment performed by the fuel control unit to reach the rated engine speed. If the first engine speed command is larger than the rated engine speed, the load placed on the engine by the alternator acts to drag engine speed down from the commanded engine speed. In doing so, the engine may be operated at its maximum torque line for a given engine speed, achieving higher efficiency. Further, the rated engine speed may be a lower speed than the maximum rated speed, thus enabling a reduction in fuel consumption.

As explained above, the load placed on the engine acts to drag the engine speed down to the rated speed. During this time, horsepower may be relatively unregulated (e.g., not held to a specific horsepower). Once the rated engine speed is reached, the speed command sent to the fuel control unit may be adjusted to bring the engine horsepower to the target horsepower. Thus, at 322, method 300 includes adjusting the engine speed command to a second engine speed command and adjusting the load placed on the engine to reach the target horsepower. The engine speed command may be adjusted based on the difference between the actual horsepower and the target horsepower in one example, or according to another suitable mechanism. Method 300 then ends.

When the load placed on the engine drags the engine speed down, the amount of fuel supplied to the engine may continue to increase as the load is applied to the engine as the fuel control unit attempts to reach the commanded engine speed. However, the amount of fuel supplied to the engine may be limited by various parameters, such as peak cylinder pressure, air-fuel ratio limit, or other parameters, such that the engine operates with a maximum amount of fuel for highest efficiency while the alternator maintains the engine speed at a lowest possible speed for maintaining the target horsepower.

Thus, according to the method of FIG. 3, the engine speed is adjusted to reach the targeted HP at the most efficient operating point of the engine, which may be when the engine is on the max torque curve. In some examples, the method may slowly increase or reduce engine speed while continuing to fully load the engine at that speed. The method may be implemented according to a control scheme with an outer control loop trying to reach a specific HP set point adjusting the engine speed setpoint and an inner loop adjusting the HP load applied to the engine to hold engine speed to the setpoint.

Figure 4:
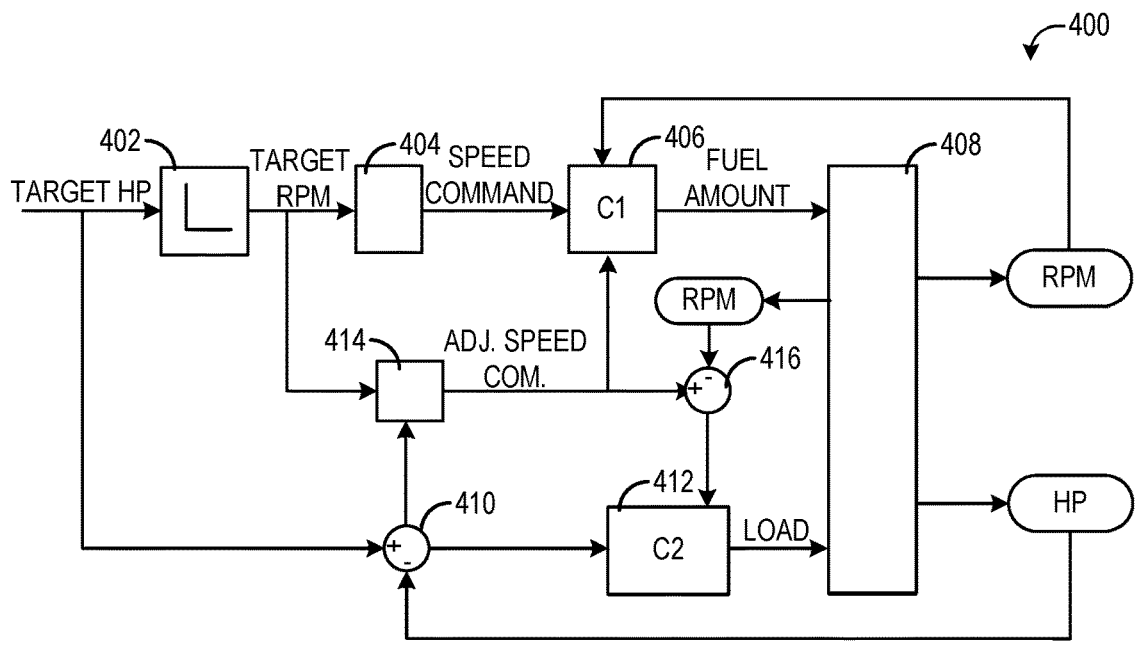
FIG. 4 is an example control diagram.

FIG. 4 is a diagram 400 illustrating an example control routine for adjusting an engine to operate at a target horsepower. In one example, the control routine of diagram 400 may be enacted during a full propel call (e.g., when a throttle is set at maximum). The control routine of diagram 400 may represent the inputs, outputs, and actions taken by the controller during the execution of method 300 of FIG. 3, described above. As described previously and in more detail below, the controller may be comprised of separate control units, including a first control unit for regulating fuel to the engine and a second control unit for regulating the load placed on the engine by the drive system.

As shown in diagram 400, in a first loop of the control diagram, a target horsepower obtained in a suitable manner (e.g., from a remote dispatch, based on operating parameters, etc.) is entered into a look-up table 402 in order to obtain a target or rated engine speed. The target engine speed is input to offset block 404, which adds an offset (e.g., 30 rpm) to the target engine speed to produce an engine speed command that is entered into a first control block 406 (which may located on the fuel control unit) to determine a fuel amount to supply to the engine. The fuel amount may represent the amount of fuel that is to be supplied by each fuel injector of the engine, or it may represent a total amount of fuel to be supplied per engine cycle, for example. The amount of fuel is supplied to the engine (represented by block 408). As the engine operates, engine speed (RPM) and output (HP) are measured by the respective sensors.

In a second loop of the control diagram, the target horsepower is compared to the measured horsepower at a load error block 410. The difference between the target and measured horsepower is input into a speed control block 414 along with the target engine speed to determine an adjustment to the speed command. The adjusted speed command (e.g., second engine speed command described above with respect to FIG. 3) comprises the speed that the drive system control unit loads the engine down to reach. In some examples, the speed control block 414 may maintain the commanded engine speed at the first speed until measured engine horsepower exceeds the target horsepower, at which time the engine speed command may be adjusted (e.g., lowered). The adjusted engine speed command is also input into a speed error block 416 to determine the difference between the adjusted speed command and actual engine speed. This error is input into a second control block 412 along with the error determined at block 410. Based on the difference between the target and measured horsepower as well as the difference between measured engine speed and the adjusted engine speed command, the second control block determines an amount of load to place on the engine by the alternator. For example, if the measured horsepower is less than the target horsepower, additional load may be placed on the engine by the alternator.

As explained above, the first control block 406 may be located on the fuel control unit while the second control block 412, along with the map look-up, offset block 404, speed adjustment block 414, load error block, and speed error block 416, may be located on the drive system control unit.

Figure 5:
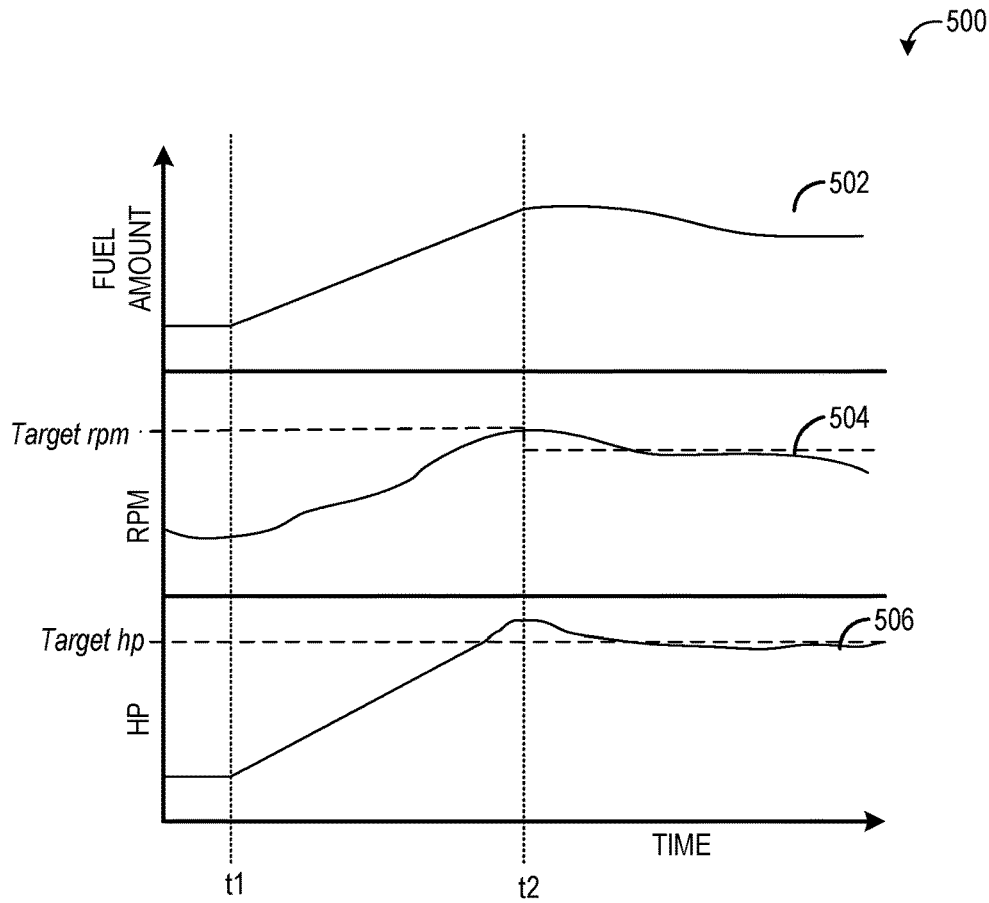
FIG. 5 is a diagram illustrating example engine parameters during operation of the vehicle of FIG. 2.

FIG. 5 is a diagram 500 illustrating example operating parameters during execution of the control routine of FIG. 4 and/or the method of FIG. 3. Diagram 500 illustrates a fuel amount supplied to engine, represented by curve 502, engine speed, represented by curve 504, and engine output (HP), represented by curve 506. For each operating parameter, time is depicted along the x-axis and respective values for each parameter is depicted along the y-axis.

Prior to time t1, the vehicle may be operating at a steady, less-than-full propel call. For example, the vehicle may be traveling on a flat surface prior to reaching a grade out of a mine quarry. Accordingly, the engine is operating at less than maximum fueling, engine speed, and load. At time t1, an operator may request a full propel call (e.g., maximum throttle) in response to starting to ascend a steep grade out of the quarry, for example. In order to reach the target horsepower set for full call, the amount of fuel supplied to the engine increases in order to increase engine speed. Engine horsepower also begins to increase. At time t2, engine speed reaches the target speed, which may include an offset such that the target engine speed is actually higher than a desired engine speed. Accordingly, the horsepower continues to increase to drag the engine speed down to a lower, second target engine speed (e.g., the target engine speed minus the offset). As this second engine speed is also commanded to the fuel control unit as the target engine speed at time t2, the horsepower of the engine also decreases to the target horsepower. Due to the reduction in engine speed (while maintaining operation at full target horsepower), the amount of fuel that is supplied to the engine decreases, thus resulting in decreased fuel consumption. The method, control diagram, and corresponding operating parameters described above with respect to FIGS. 3-5 disclosed an example of reaching a target horsepower in response to a request to operate at maximum engine output (e.g., a full propel call or maximum throttle request). However, the mechanism of reaching a target horsepower may be applied during other operating conditions, such when full call is not requested but the requested engine output is relatively close to full call, such as >80% maximum output. For example, if a first vehicle is climbing a hill and reaches a threshold distance from a second vehicle traveling in front of the first vehicle, the operator of the first vehicle may reduce engine output to avoid hitting or otherwise traveling too close to the second vehicle. In such an example, the target horsepower for the first vehicle may be reduced and the new target horsepower reached according to the method described above. Further, if the operator of the first vehicle subsequently returned to full propel call, the same mechanism could be used to reach the full target horsepower.

Figure 6:
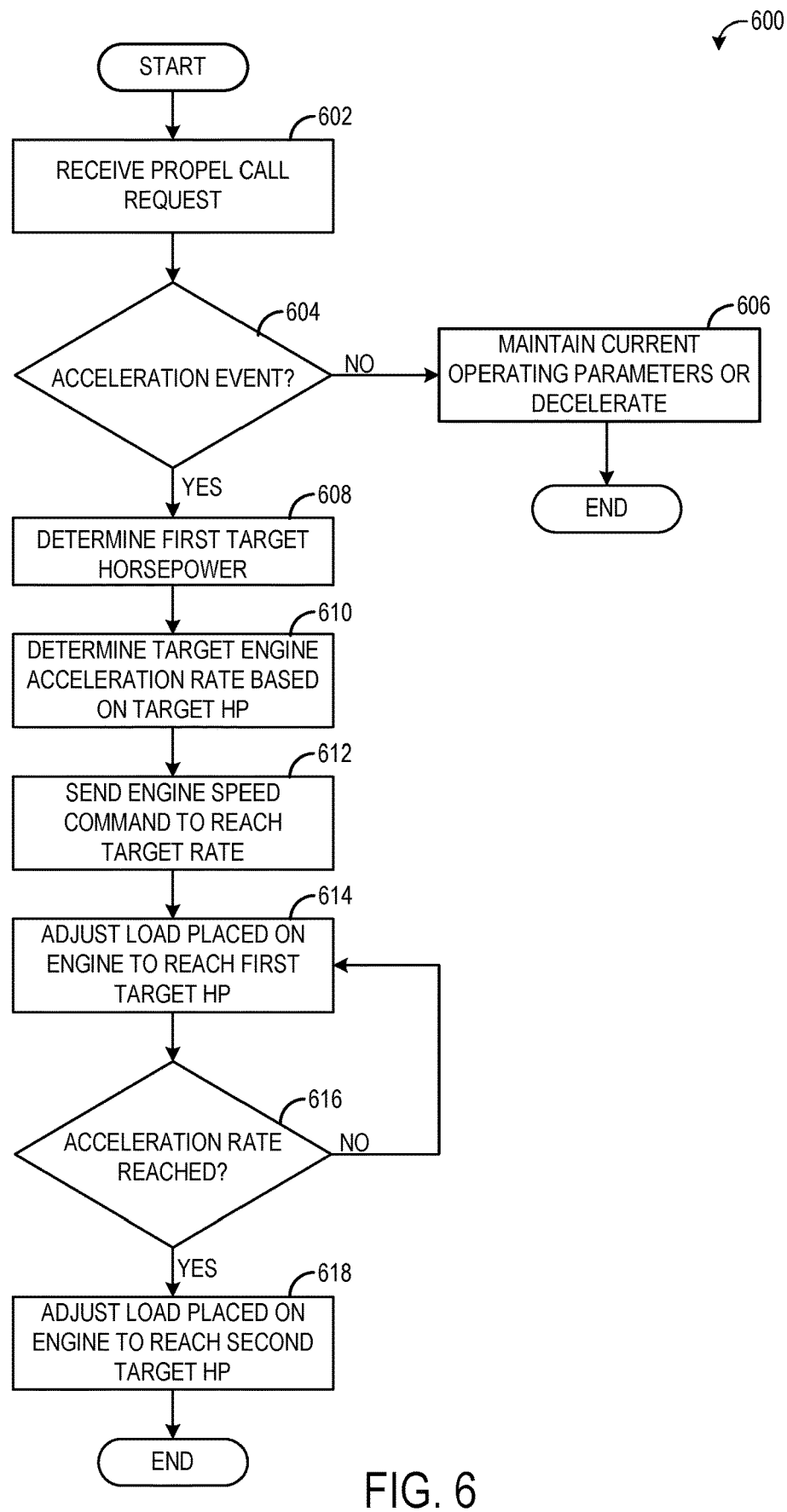
FIGS. 6-8 are flow charts illustrating additional example methods for operating the vehicle of FIG. 2.

In another example, the method for reaching the target horsepower described above may be used during an acceleration event that may not necessarily include a request to operate a full propel call. Further, in some examples it may be desirable to slow down the rate of the increase in engine speed when attempting to reach the target horsepower in response to a request to operate at maximum engine output, in order to reduce fuel consumption during the acceleration. FIG. 6 illustrates a method 600 for operating an engine during an acceleration event. Similar to method 300, method 600 may be performed by a controller, such as the controller 26 described above, in combination with various sensors and actuators, such as an engine speed sensor, engine output sensor, fuel injectors, etc., according to instructions stored on memory of the controller.

At 602, method 600 includes receiving a propel call request, e.g., a power setting requested by an operator of the vehicle. At 604, method 600 determines if the request includes an acceleration event, for example if the request includes an increase in requested power. If no, method 600 proceeds to 606 to maintain current operating parameters, which may include maintaining current engine speed and/or horsepower, or to initiate a deceleration. Method 600 then returns.

If an acceleration event is requested, method 600 proceeds to 608 to determine a first target horsepower. The first target horsepower may be determined in a similar manner as the target horsepower described above with respect to FIG. 3. However, the first target horsepower may be a different horsepower than the target horsepower that is desired for the requested propel call in order to increase or decrease the rate of the acceleration.

At 610, a target engine acceleration rate may be determined based on the target horsepower, for example from a look-up table. At 612, an engine speed command is sent from the drive system control unit to the fuel control unit in order to reach the target acceleration rate. Further, at 614, the load placed on the engine by the alternator may be adjusted to reach the first target horsepower.

At 616, it is determined if the first acceleration rate is reached. If not, method 600 loops back to 614 to continue to adjust the loading of the engine until the target rate is reached. Once the target rate is reached, method 600 proceeds to 618 to adjust the load placed on the engine to reach a second target horsepower. The second target horsepower may be different than the first target horsepower, for example it may be lower. In this way, the engine may be rapidly accelerated until a desired acceleration rate is achieved, and then the target horsepower may be lowered to maintain the target acceleration rate. Further, in some examples, once a target engine speed has been reached, the loading on the engine may be adjusted to reach a third target horsepower, which may be the same as the second target horsepower, or it may be different.

Off-highway vehicles, such as mine haul vehicles, may be operated in a convoy over cycles that include a trip from a loading site to a dump site and back, for example. These mine haul cycles are typically limited by the slowest vehicle configuration within the convoy. A lower power to gross vehicle weight (GVW) haul truck can limit on-grade speed for a much faster haulage class configuration. A single slow truck with low HP or overloaded of identical haulage configuration can also slow on grade speeds. In these scenarios, where convoy includes vehicles with mixed configurations, a mine may benefit from simple HP/ton GVW matching.

Thus, according to embodiments disclosed herein, optimization for fuel is achieved for vehicles operating in a convoy with a slower vehicle. In standard state of the art system, the operator in the faster vehicle will decrease accelerator request to maintain the speed of slower vehicle. However, as disclosed herein, reduced HP demand is identified to allow a vehicle to operate at optimal efficiency for the less than peak performance points. In mines with mixed fleets, it may be desirable to reduce HP on vehicles to improve fuel, which essentially keeps the vehicles with a balanced HP per ton GVW.

Figure 7:
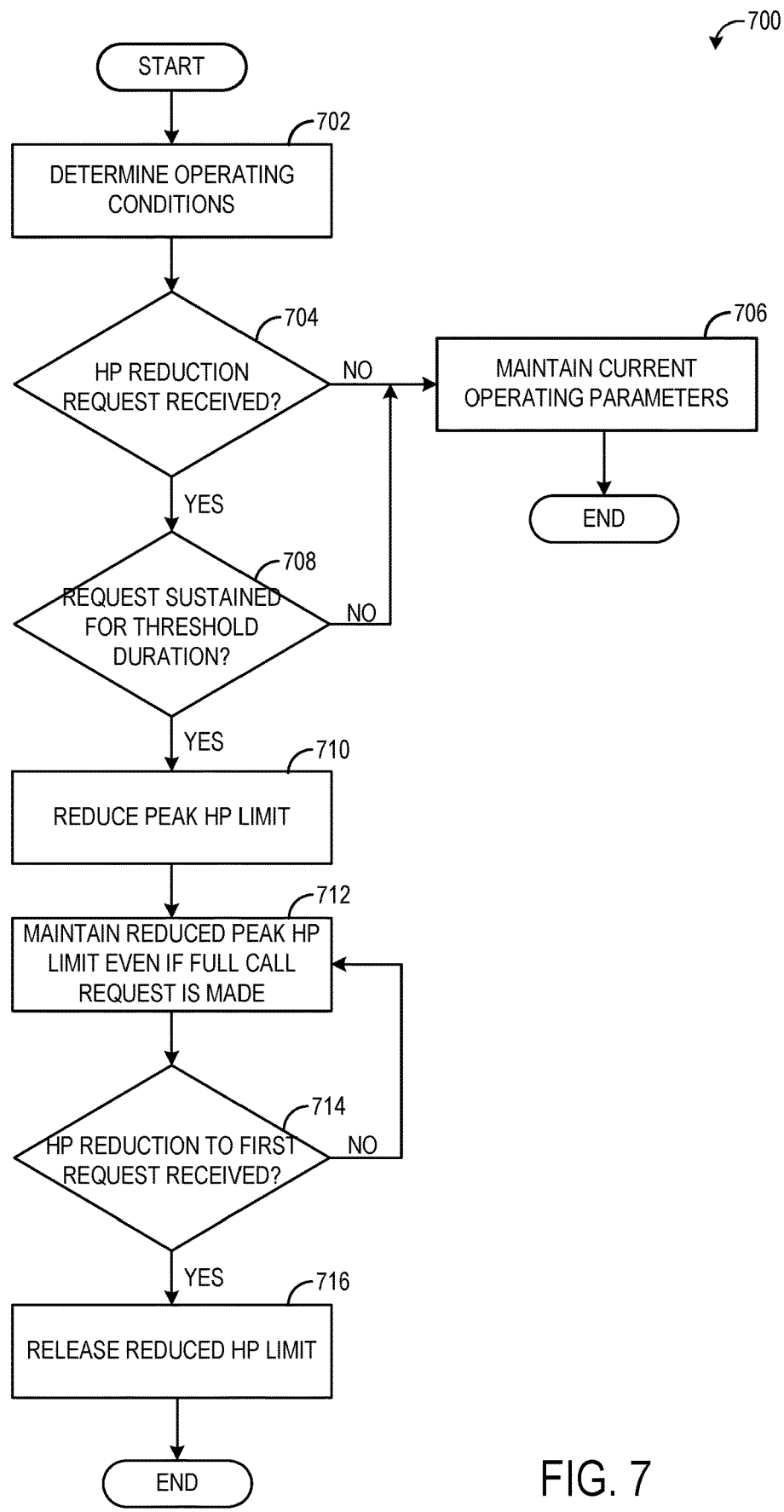

FIG. 7 illustrates a method 700 for limiting target HP based on a slow vehicle. The method of FIG. 7 may address the issues described above by automatically limiting the HP of a vehicle when it is detected that the vehicles has been operated at a reduced load call for a given amount of time. Method 700 may be carried out by a controller, such as controller 26 of FIG. 2, according to instructions stored on memory of the controller, similar to the methods 300 and 600 described above.

At 702, method 700 includes determining operating conditions. The operating conditions may include current load call, time spent at current load call, and other parameters. At 704, method 700 includes determining if a load call reduction request has been received. For example, a vehicle operator may reduce an accelerator request. In some examples, only a change of load call greater than a threshold may be detected, such as a reduction to 80% or 90% load or a change of 3% or greater from full call. If no reduction has been requested, method 700 proceeds to 706 to maintain current operating parameters, and then method 700 ends. If a reduction has been requested, method 700 proceeds to 708 to determine if the reduction request has been sustained for a threshold duration, such as 30 seconds. If no, method 700 proceeds to 706 and then ends.

If yes, method 700 proceeds to 710 to reduce the peak HP limit. The peak HP limit may be set at a percentage of the target HP determined according to the method of FIG. 3, for example. In the example described above, a 90% call may result in a reduced HP limit of 90% of the target HP. However, the HP limit may be reduced according to any suitable mechanism. The reduced HP limit may be maintained, even after the operator returns to the accelerator to the full call position, as indicated at 712. A Diagnostic Information Display (DID) can be used to have a tab with what HP limit is being applied, so that if there is question if this limit is being applied it can be displayed in real time to operator.

To release the reduced HP limit, method 700 determines if the accelerator has been released to or past the original reduced load call at 714. If no, method 700 returns to 712 to continue to operate with the reduced peak HP limit. If yes, method 700 proceeds to 716 to release the reduced HP limit and return to the target HP limit. In another example, if the vehicle has been operated at full call for greater than a threshold period of time, the reduced peak HP limit may be lifted. In some examples, rather than release the HP limit suddenly resulting in a rapid increase to full call, the limit may be released gradually. Method 700 then ends.

Thus, method 700 provides for imposing a reduced HP limit once a load reduction request has been sustained. For example, after 0.5 minute of stable decreased performance operation the system reduces peak HP capability to allow an operator to maintain the reduced performance speed at a full pedal request.

Full HP can be requested by the operator releasing the accelerator pedal to the previous level or less than the previous level that prompted the reduced performance. In the 90% call example the operator could let off the pedal to 90% and speed on grade would not change, but re-application would allow 100% full HP again.

This reduced peak HP limit feature described above may be utilized to identify a mine that is running a mixed fleet and would benefit significantly by having a reduced HP on the faster vehicles. This should eliminate the need for mine to be adjusting each vehicle to specific HP to match haul speeds of various vehicles.

To facilitate this analysis, the following inputs may be used: enable HP reduction feature, HP Δ per haul cycle, time at reduced HP on grade to trigger HP change for next cycle, time at full propel call on grade to trigger HP change for next cycle, and minimum % call to enable the feature (default 70%). By analyzing this information over one or more haul cycles, it may be determined that a vehicle is operating at less-than-full call a significant amount of time, and its peak HP limit may be reduced, not just transiently but permanently, until further analysis reveals the vehicle is once again operating at full call a majority of the time, at which time the peak HP limit may be increased. When operating with a reduced peak HP limit, a Diagnostic Information Display (DID) can be used to have a tab with what HP limit is being applied (or another output mechanism may be activated, such as an indicator light), so that if there is question if this limit is being applied it can be displayed in real time to the operator.

Figure 8:
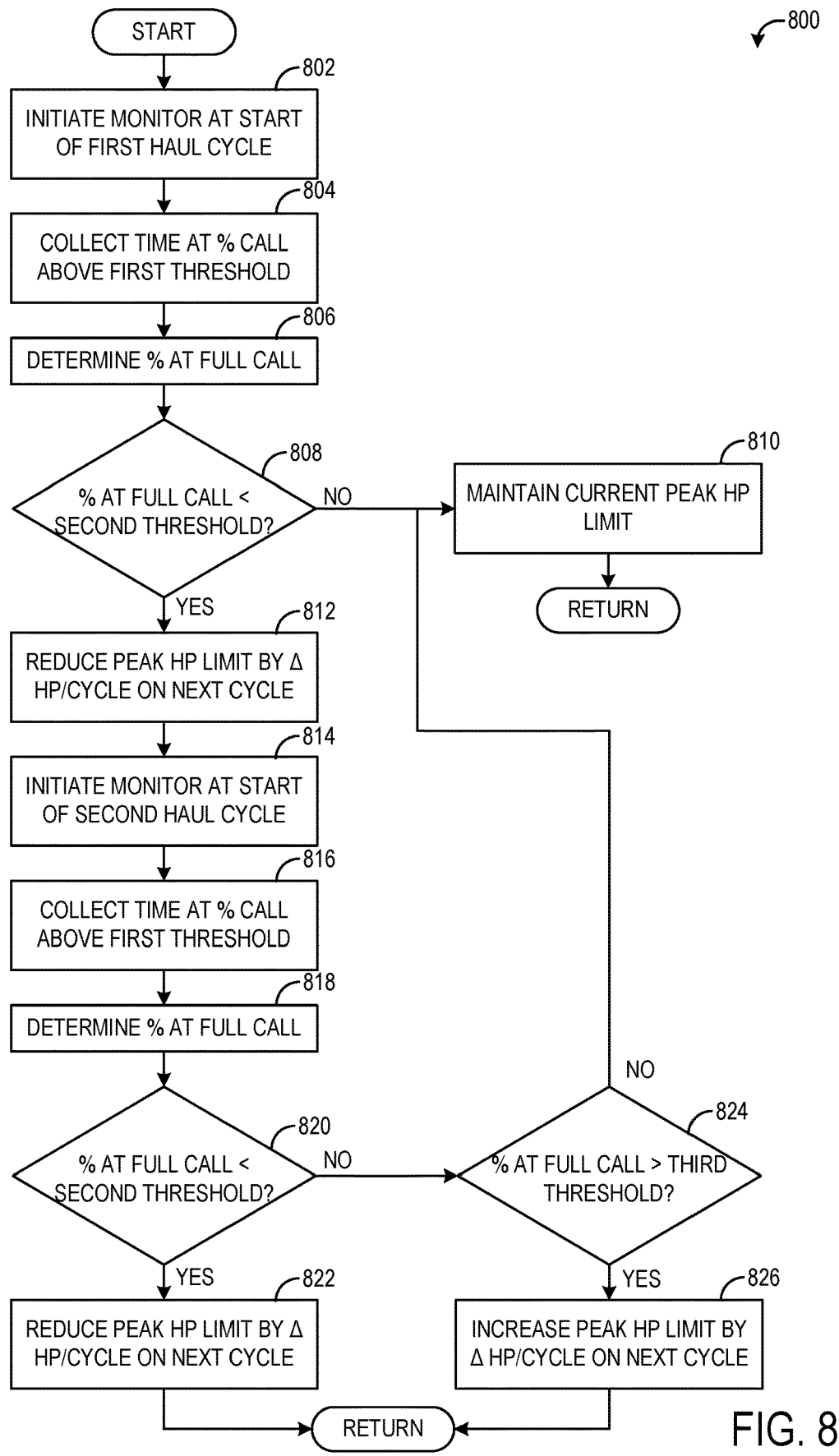

FIG. 8 illustrates a method 800 for a smart maximum HP limit over a long cycle is presented. At 802, method 800 includes initiating a monitor at the start of a first haul cycle. The monitor may collect the information described above, including collecting an amount of time above a threshold % call (e.g., 70%) at 804, to remove time spent at idle, stopped, etc., from the analysis. This may include, in some examples, collecting the amount of time spent on a grade, which may be determined by evaluating torque applied by the wheel motors or speed and power, or may be determined by measuring incline with a sensor. At 806, the proportion of time spent at full call is determined. In some examples, this may include determining the proportion of time spent at full call while operating on a grade (e.g., a grade of greater than 0%). At 808, method 800 determines if the percent time at full call is less than a second threshold. The second threshold may be a suitable threshold that indicates the vehicle desired power may be limited by another vehicle in the convoy, such as 90%, 80%, or other suitable threshold. If the percent at full call is not less than the second threshold, method 800 proceeds to 810 to maintain a current peak HP limit, and then method 800 returns. If the percent at full call is less than the second threshold, method 800 proceeds to 812 to reduce the peak HP limit by a ΔHP/cycle on the next haul cycle. The ΔHP/cycle may be a fixed value (e.g., 5%), or it may represent the average change in HP over the current and/or previous haul cycles.

At 814, the monitor is initiated at the start of the next haul cycle. The monitor collects the time at the percent call above the first threshold at 816 and determines the percent at full call at 818. At 820, method 800 determines if the percent at full call is less than the second threshold. If yes, method 800 proceeds to 822 to reduce the peak HP limit by ΔHP/cycle on the next cycle, and then method 800 returns. However, if the answer at 820 is no, method 800 proceeds to 824 to determine if the percent at full call is greater than a third threshold, higher than the second threshold. If the answer is no, method 800 proceeds to 810 to maintain current operating parameters. If the answer is yes, method 800 proceeds to 826 to increase the peak HP limit by ΔHP/cycle on the next cycle, and then method 800 returns.

Thus, according to method 800, for each cycle the propel call (while above a minimum percentage propel call) is collected. If the vehicle spends a significant amount of time below full propel call, the system will remove HP from the system limit using the HP Δ per haul parameter. If the next cycle has a long period of time at the 100% (indicates increased HP could be utilized) the next cycle will be increased by the HP Δ. The increase function is needed because if all vehicles have a continually reducing HP feature and no way to increase it automatically then natural load variation could cause such a feature to continually reduce fleet HP, which may not be desirable. In some examples, the amount of HP that can be removed by this feature may be limited by a predetermined bound, for example up to 10%. Further, in some examples, the Δ hp/cycle may be obtained from a look-up table based on the average propel call percent (e.g., a lower average propel call percent causes a larger adjustment after that cycle).

Thus, the methods and systems described above provide for multiple mechanisms for adjusting engine speed and/or power output of an off-highway vehicle. In one example, an adjustable HP target may be used, and a target engine speed determined based on the target HP. The target engine speed may be adjusted to include an offset such that the engine is commanded to operate a higher engine speed than the target, and the engine may be loaded to drag engine speed down to the target speed. Further, once the target engine speed is reached, if the engine is not operating at the target HP, the engine speed commanded to the engine may be adjusted until the engine output reaches the target HP. This feature may reduce rated speed in a continuous fashion to the minimum needed to make rated power, while providing closed loop on traction power. The engine speed setpoint may be moved up or down to make desired traction HP.

Further, a smart maximum HP limit is provided. When on grade, the percentage of time not at full power is monitored. If this exceeds a threshold, the HP is reduced, resulting in reduced speed on grade and running at new "rated" point. To optimize operating point, advanced max HP logic may be included.

An embodiment for a system is provided. The system includes an engine; and a controller configured to: determine a target engine horsepower and associated target engine speed; command the engine to operate at a first engine speed above the target engine speed; and adjust a load placed on the engine to reach the target engine speed. The controller may be further configured to command the engine to operate at a second engine speed to reach the target engine horsepower. The controller may be configured to adjust the load placed on the engine to reach the target engine speed, up to a maximum load. The controller may be configured to command the engine to reduce engine speed if engine horsepower is above the target engine horsepower while the load is placed on the engine. To command the engine to operate at the first engine speed, the controller may be configured to send a command to operate at the first engine speed to a separate fuel controller. The controller may be configured to adjust the load placed on the engine to reduce engine speed from the first engine speed to the second engine speed, the second engine speed a lowest possible engine speed that maintains the target engine horsepower. The controller may be configured to select the target engine speed based on one or more of the target engine horsepower and maximum torque. The controller is configured to select the target engine horsepower based on operating conditions. The controller may be configured to determine the target engine horsepower and command the engine to operate at the second engine speed to reach the target engine horsepower in response to receiving a full throttle request. The controller may be configured to, if a less than full throttle request is received, determine a second target engine horsepower and associated second target engine speed, command the engine to operate at a third engine speed above the second target engine speed, and adjust the load placed on the engine to reach the second target engine speed. The controller may be further configured to monitor an amount of time spent operating under the full throttle request over one or more operating cycles, and if the amount of time is less than a threshold, the controller is configured to lower the target engine horsepower for a subsequent operating cycle. In some examples, the target engine horsepower is lowered by a predetermined amount. In other examples, the target engine horsepower is lowered by an amount based on the time spent operating under the full throttle request. The system further comprises one or more traction motors and an alternator, the alternator driven by the engine to generate electrical power to drive the one or more traction motors, and wherein the load placed on the engine to reach the target engine horsepower is load placed on the engine by the alternator.

Another embodiment for a system for a vehicle comprises an engine having a plurality of cylinders; a fuel system to supply fuel to the engine; a drive system including an alternator to provide electrical energy to a plurality of traction motors, the alternator driven by the engine; and a drive system controller configured to send a command operable to control the fuel system to supply an amount of fuel to the engine based on a target engine speed and control the drive system to adjust a load placed on the engine and engine speed to reach a target engine horsepower.

The drive system controller is configured to adjust the load placed on the engine and the engine speed by placing a load on the engine from the alternator. The target engine speed may comprise an engine speed that is greater than a selected engine speed that is selected based on the target engine horsepower. In one example, the target engine horsepower is received from a remote dispatch system.

An embodiment relates to a method, comprising: responsive to receiving a request to increase engine power, adjusting an engine speed command to reach a target engine acceleration rate, and adjusting a load placed on the engine based on a first target horsepower; and once the target engine acceleration rate is reached, adjusting the load placed on the engine based on a different, second target horsepower.

In an example, the second target horsepower is lower than the first target horsepower. The method further comprises determining a target engine speed based on the second target horsepower, and adjusting the engine speed command to reach the target engine speed. Adjusting the engine speed command may comprise adjusting an engine speed command sent to a remote engine fuel controller, and adjusting the load placed on the engine may comprise adjusting a load placed on the engine by an alternator.

As used herein, an element or step recited in the singular and proceeded with the word "a" or "an" should be understood as not excluding plural of said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property. The terms "including" and "in which" are used as the plain-language equivalents of the respective terms "comprising" and "wherein." Moreover, the terms "first," "second," and "third," etc. are used merely as labels, and are not intended to impose numerical requirements or a particular positional order on their objects.

This written description uses examples to disclose the invention, including the best mode, and also to enable a person of ordinary skill in the relevant art to practice the invention, including making and using any devices or systems and performing any incorporated methods. The patentable scope of the invention is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal language of the claims.

The invention claimed is:

1. A method for operating an engine, comprising:
responsive to receiving a request to increase engine power, determining a first target horsepower and a target acceleration rate based on the target horsepower;
adjusting an engine speed command to reach a target engine acceleration rate;
adjusting a load placed on the engine based to reach the first target horsepower; and
once the target engine acceleration rate is reached, further adjusting the load placed on the engine.

2. The method of claim 1 wherein once the target engine acceleration rate is reached, the load placed on the engine is adjusted based on a different, second target horsepower.

3. The method of claim 1 wherein the engine is in a vehicle, the vehicle being a mine haul vehicle.

4. The method of claim 3 further comprising operating the vehicle in a convoy.

5. The method of claim 4 further comprising responsive to receiving a request to decelerate the vehicle, including a reduced HP demand, reducing a peak horsepower limit.

6. The method of claim 4 wherein the reduced peak horsepower limit is determined as a percentage of one of the first and second target horsepowers.

7. A method, comprising:
operating a convoy of mine haul vehicles, where a first vehicle in the convoy has a lower power to gross vehicle weight (GVW) than a second vehicle in the convoy and
matching HP/ton GVW of the vehicles by limiting a peak HP limit of the second vehicle responsive to a request to decelerate the second vehicle.

8. The method of claim 7 further comprising automatically limiting the HP of the second vehicle when it is detected that the vehicle has been operated at a reduced load call for a given duration.

9. The method of claim 8 wherein automatically limiting the HP of the second vehicle includes setting the peak HP limit of the second vehicle at a percentage of a target HP.

10. The method of claim 8 wherein automatically limiting the HP of the second vehicle includes monitoring parameters over one or more haul cycles, and determining that a vehicle is operating at less-than-full call a threshold amount of time, and limiting the vehicle's peak HP limit responsive thereto.

11. The method of claim 10 wherein the operating parameters comprise one or more of an enable HP reduction feature, a HP Δ per haul cycle, a time at reduced HP on grade to trigger HP change for next cycle, a time at full propel call on grade to trigger HP change for next cycle, and a minimum % call to enable the feature.

12. The method of claim 10 wherein the limiting includes limiting HP until further analysis reveals the vehicle is once again operating at full call more than the threshold duration, at which point the peak HP limit is increased.

13. The method of claim 12 wherein the analysis ignores idle operation.

14. The method of claim 10 further comprising, when operating with a reduced peak HP limit, operating with a Diagnostic Information Display (DID) providing a display to an operator with what HP limit is being applied.

15. The method of claim 8 wherein an adjustable HP target for each vehicle is used, and a target engine speed determined based on the target HP.

* * * * *